Nov. 10, 1942.                B. B. HOLMES                 2,301,404
METHOD OF TRANSLATING HEAT ENERGY INTO MOTIVE POWER
Filed March 20, 1939          3 Sheets-Sheet 2
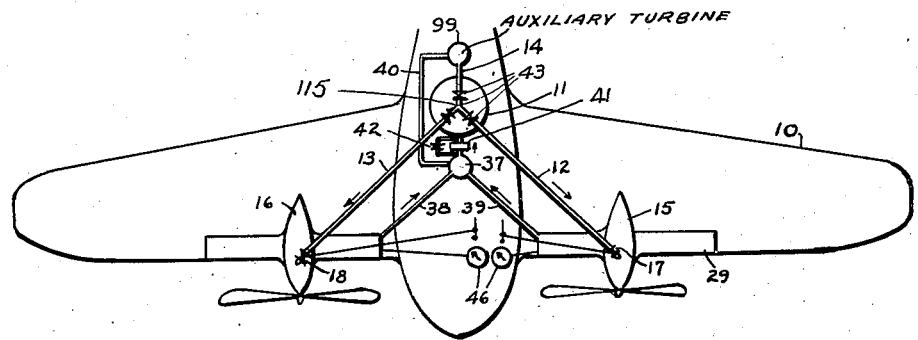
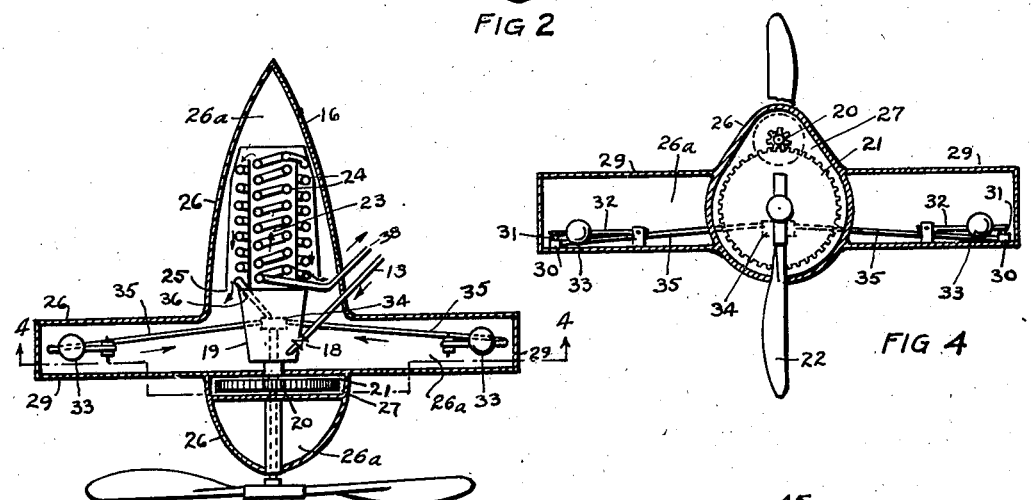
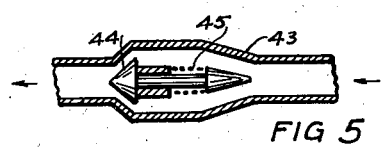
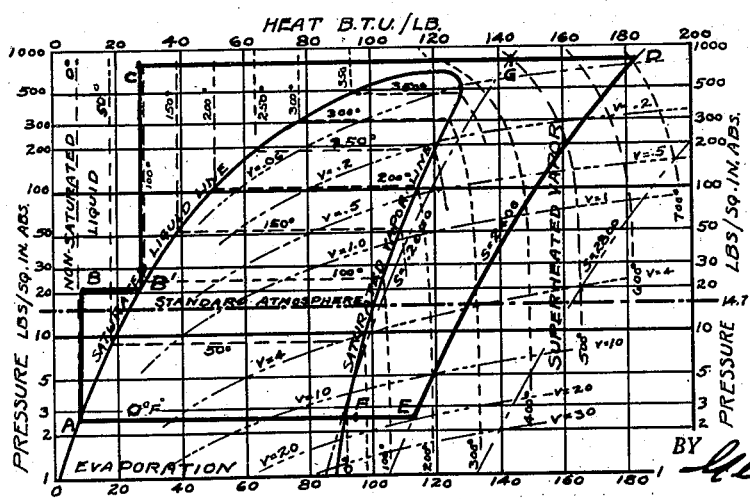
INVENTOR.
BRADFORD B. HOLMES
BY
ATTORNEY.

Patented Nov. 10, 1942

2,301,404

UNITED STATES PATENT OFFICE 2,301,404

METHOD OF TRANSLATING HEAT ENERGY INTO MOTIVE POWER

Bradford B. Holmes, New York, N. Y.

Application March 20, 1939, Serial No. 263,061

15 Claims. (Cl. 60—36)

The present invention relates to a novel method of converting heat into motive power, and more particularly to a novel method of powering a propeller-driven aircraft by vaporizing, superheating, expanding and liquefying a novel working fluid, and utilizing the expansion of the fluid vapor to operate a turbine for driving the propeller.

Various fluids such as alcohols, analine, benzol, carbon tetrachloride, ether, sulphur dioxide, toluol, water and xylol have been suggested heretofore for use as a working fluid for converting heat into motive power by a thermodynamic cycle of vaporizing, superheating, expanding and liquefying said fluid, but all such prior art fluids have many serious disadvantages and drawbacks which render them impractical or dangerous and, therefore, unsuitable for commercial use, especially for operating a power plant of an aircraft such as a passenger airliner, for example, where space is necessarily limited, reduction of weight extremely important, and utmost safety to passengers and crew absolutely essential.

The principal disadvantages of such prior art working fluids are that either their critical temperatures and pressures are entirely too high for practical purposes, requiring tremendous volumes of liquid, thereby necessitating extremely large and heavy boilers and pipes, or they are highly toxic, corrosive, inflammable and combustible, hereby rendering their use very dangerous to human life and property and causing rapid deterioration of the equipment, or they are too volatile and do not provide enough kinetic energy to produce sufficient power, especially the great amount of power that is require in an aircraft engine.

Moreover, none of the prior art fluids that have been suggested for use as working fluids for converting heat into motive power has thermodynamic properties suitable for driving a turbine at highest efficiency with utmost safety.

In accordance with the present invention, it has been discovered, by a process of extropolation and plotting of heat-pressure diagrams of a series of fluids containing various chemical combinations of carbon, chlorine and fluorine, that these fluids have excellent physical and thermodynamic properties which render them extremely suitable and highly desirable for use as a working fluid for converting heat into motive power by a thermo 'ynamic cycle of vaporizing, superheating, expanding and liquefying the fluid.

These fluids are known as "Freons" and the ones found suitable for the above-mentioned purpose are, for example, Freons F—11 which is trichloro-monofluoro-methane $(CCl_3F)$, F—12 which is dichloro-difluoro-methane $(CCl_2F_2)$, F—21 which is dichloro-monofluoro-methane $(CHCl_2F)$ and F—113 which is trichloro-trifluoro-ethane $(C_2Cl_3F_3)$. The following table gives data on these four fluid substances:

| Name | F—12 Dichloro-difluoro-methane | F—21 Dichloro-monofluoro-methane | F—11 Trichloro-monofluoro-methane | F—113 Trichloro-trifluoro-ethane |
|---|---|---|---|---|
| Formula | $CCl_2F_2$ | $CHCl_2F$ | $CCl_3F$ | $C_2Cl_3F_3$ |
| Melting point | −252° F. | −211° F. | −168° F. | −31° F. |
| Abs. critical pressure | 582 | 750 | 635 | 499 |
| Critical temperature | 233° F. | 353° F. | 383° F. | 417° F. |
| Absolute pressure at— | | | | |
| 5° | 26.5 | 5.243 | 2.931 | .9802 |
| 40° | 51.7 | 12.32 | 7.032 | 2.655 |
| 86° | 107.9 | 31.23 | 18.28 | 7.856 |
| 100° | 131.6 | 40.04 | 23.60 | 10.48 |
| Density at 86° | 2.569 | .5770 | .5666 | .3360 |

All of the above-listed fluids are non-toxic, non-combustible and non-corrosive to metal, and each has a low melting point, low critical temperature and low critical pressure, thereby making them suitable for the purpose of the present invention. The choice of fluid for powering an airplane largely depends upon the prevailing condensing temperature, whether the craft is traveling at sub-zero conditions or higher temperatures, and upon the thermal efficiency obtainable from the fluid under the prevailing conditions. That is, an airplane operated in the winter or at high altitudes might use one fluid, whereas in summer or at low altitudes, another of the Freons might be used to better advantage.

Accordingly, one of the objects of the present invention is to provide a novel method of converting heat into motive power by vaporizing, superheating, expanding and liquefying a novel working fluid comprising carbon, chlorine and fluorine in stable chemical combination and which is non-volatile, non-corrosive, non-combustible, non-toxic and which has a relatively low melting point, low critical temperature, low critical pressure and relatively high density, whereby the hereinbefore-mentioned disadvantages and drawbacks are substantially eliminated, thereby making it possible to build an engine which is much smaller and lighter than heretofore and particularly suitable for powering an aircraft, and whereby the engine may be operated with greater efficiency and utmost safety which is so desirable and necessary on aircraft.

Another object of the invention is to provide a novel method of powering a propeller-driven aircraft by converting heat into motive power by a thermodynamic cycle of vaporizing, superheating, expanding and liquefying a working fluid, which method includes employing as the working fluid a vaporizable, non-inflammable liquid comprising carbon, chlorine and fluorine in stable chemical combination, raising the pressure of said liquid to a pressure between 400 and 1000 pounds per square inch while in the liquid state, heating said liquid to a temperature between 200° F. and 420° F. to vaporize it without boiling, superheating the vapor to a temperature high enough to ensure dry vapor throughout the desired expansion range, expanding said vapor to a desired condensing pressure, utilizing the expansion of said vapor to drive the aircraft propeller, condensing said vapor to a liquid, and continuously repeating the cycle.

The foregoing and other objects and advantages of the invention will appear more fully hereinafter from a consideration of the detailed description which follows, taken together with the accompanying drawings wherein one form of apparatus for carrying out the invention and for applying it thereto is illustrated by way of example. It is to be expressly understood, however, that the drawings are only for the purpose of showing the manner of carrying out and applying the novel method of the invention, and are not to be construed as defining the limits of the invention, reference being had for this purpose to the appended claims.

In the drawings, wherein like reference characters refer to like parts:

Fig. 2 is a similar view with turbines for two propellers and for auxiliary power;

Fig. 3 is a diagrammatic horizontal cross-section of a turbo-propeller;

Fig. 4 is a vertical section on line 4—4, Fig. 3;

Fig. 5 shows the details of an automatic shut-off valve;

Fig. 6 is a pressure-heat Mollier diagram of F—11 on which is superimposed the cycle of an illustrative example.

Figure 1:
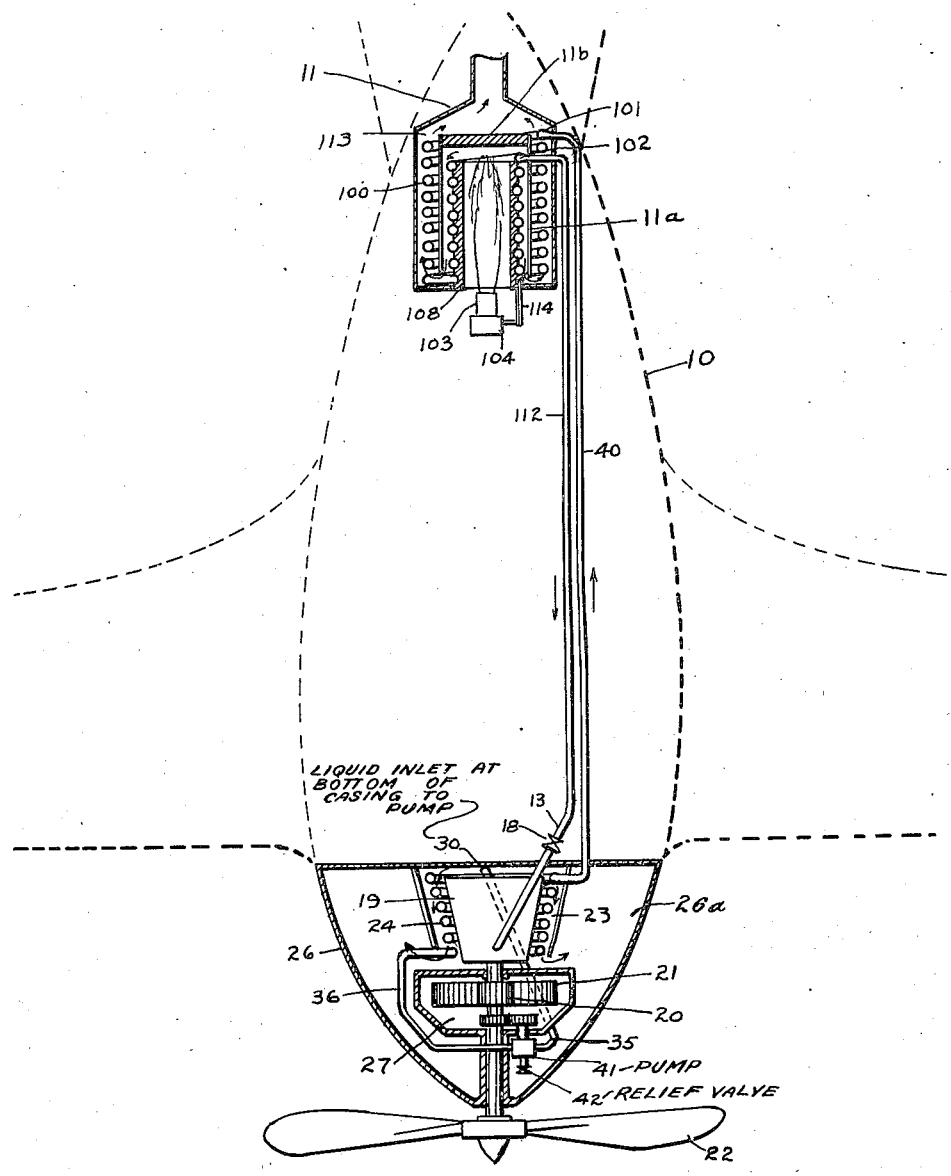
Fig. 1 is a plan view showing diagrammatically an aeroplane with single propeller equipment powered according to the method of the present invention.
Figure 7:
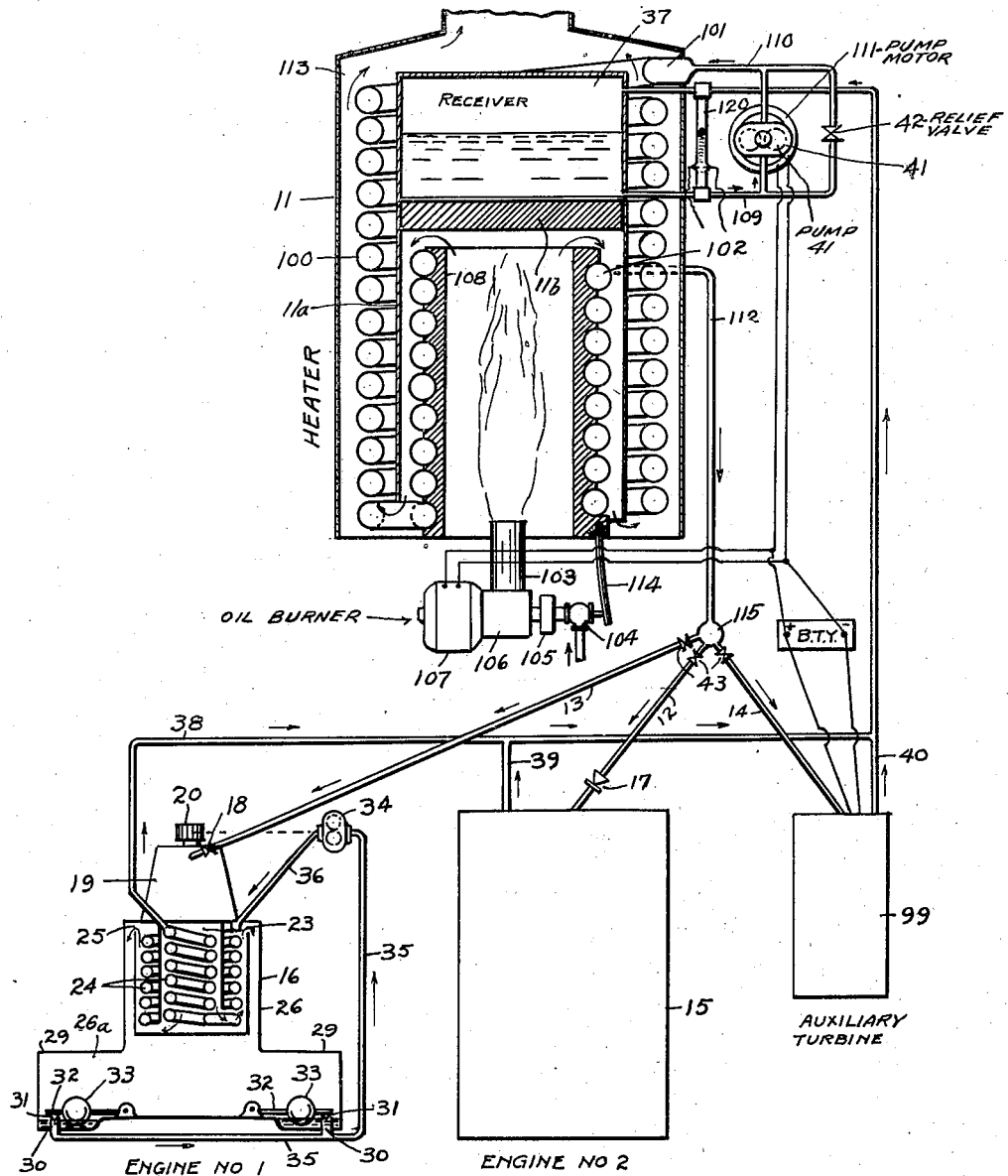
Fig. 7 is a schematic diagram of a turbine and heater showing the heater in vertical cross-section.

In Figs. 1, 2 and 7, the essential elements are indicated by similar reference numerals.

In Fig. 1, the method of the invention is applied, by way of example, to the powering of an aeroplane 10 shown as equipped with a heater 11 containing a continuous coil 100, of seamless tubing. The exit section of this coil is wound around a cylindrical core 108 of high heat conductivity such as copper; and the entrance section is coiled in a larger-diameter helix extending in the opposite direction, adjacent the outer casing. Between the two helices of the coil is a cylindrical partition 11a closed in at the end by baffle plate 11b. An oil nozzle 103 controlled by a valve in 104 directs a flame axially of the copper cylinder 108, and the hot products of combustion flow reversely, outside the copper cylinder, along the exit helix of the coil, then again reversely, outside of partition 11a, along the outer entrance helix, as indicated by the arrows.

The condensed liquid is forced through supply pipe 40, flows countercurrent to the heating draft, first through the outer helix of the coil where the progressively cooled products of combustion are coolest, then through the inner helix to its exit end, where the heat is most intense. Thus the liquid is progressively heated to maximum, while the countercurrent products of combustion are progressively cooled until the highly heated fluid flows out through the pipe 112. The flame is controlled by a metal thermostatic element 114, which governs the valve 104 to keep constant the temperature of the vapor leaving the heater. Thence the vapor flows through pipe 112 and throttle valve 18 to turbine 19, where it is expanded. Thence the expanded vapor enters the space 23, where it encounters the regenerator coil 24, wherein the condensate absorbs heat from said vapor.

From regenerator coil 24, cooled vapor following the path of the arrows, enters the condenser chamber 26a, which is the whole space within the boundary walls 26, of the unit, except the space occupied by the turbine, and except space 27 which contains the reduction gears 20, 21. The vapor condenses on the surface 26 and collects at the bottom, whence it flows through inlet 30, pipe 35, and pump 41, which forces the liquid through pipe 36, and through the above described regenerator coil 24, wherein the liquid is heated by the exhaust from the turbine. Pressure applied by pump 41 is controlled by a pressure relief valve 42 which can be set for any desired pressure that may be necessary to raise the heater output fluid to the desired pressure. The heated liquid raised to the high pressure required in the heater, is forced from pipe 24 through pipe 40, to the intake 101, of heater coil 100.

While, as above explained, there is very great advantage in having this pressure above critical so that the liquid may be all changed to vapor condition without boiling, inspection of the Mollier diagram, Fig. 6, shows that the latent heat of vaporization decreases with rise of pressure and becomes zero at the critical pressure.

It is therefore obvious that the heater may be used with pressures below the critical provided they are not so much below that excessive boiling occurs.

The turbine drives the pinion 20 which meshes with the large gear 21 on the propeller shaft, thereby reducing the turbine revolutions to the rate of revolution required for the propeller. As shown, pump 41 is geared directly to the propeller shaft.

All of the above elements, as diagrammatically indicated in Fig. 1, are embodied in diagrammatic Fig. 7 and also less diagrammatic Figs. 2, 3, 4 and 5; and for this reason such elements as are indicated in the latter figures are designated by the same numerals as in Fig. 1.

Referring to said Fig. 7, and also to Figs. 2, 3, 4 and 5, it will be seen that as before, the heater 11 comprises a continuous coil of seamless tubing, preferably Monel metal, or a number of such coils, preferably in parallel, having an inlet 101 and an outlet 102.

Heat is applied to the heater from fuel oil burned in the oil burner 103. This may be of any conventional form and comprises a throttling valve 104, oil pump 105, blower 106, and motor 107.

That part of the coil 100 which is nearest the flame is wound around a core 108 of high heat conductivity metal, such as copper, to prevent any part of the tube from becoming so highly heated as to endanger the chemical stability of the working fluid.

A liquid receiver 37, contains a supply of working liquid and is preferably placed in that part of the heater nearest the stack so that it can absorb any available heat remaining in the furnace gases. A liquid pump 41, which may be any conventional rotary or piston pump, pumps liquid from the receiver 37, into the heater 11, via pipes 109 and 110. A by-pass relief valve 42, which can be set for any desired pressure, such as 800 lbs., prevents that pressure from being exceeded in the heater.

The pump 41 may be electrically driven by a motor 111 energized from a battery as shown in Fig. 7 of the drawings.

The liquid entering at 101 passes through the tube 100, gaining temperature and heat content substantially uniformly, and passes from a liquid to a vapor without boiling as soon as its critical temperature is reached, because it is being heated at a pressure level above its critical pressure, and acquires superheat until the desired temperature is reached and escapes at 102 via pipe 112.

The hot gases from the flame travel in a countercurrent direction to the working fluid, losing heat and temperature substantially uniformly; and they leave at 113 not greatly hotter than the incoming liquid.

In order to maintain a constant temperature in the outgoing working fluid, a thermostat comprising a bimetallic strip 114 embedded in the core 108 governs the oil valve 104 to maintain a substantially constant temperature in 108.

Pipe 112 connects at 115 with pipes 12, 13 and 14 carrying the vapor to the turbo-propeller units 15 and 16, and auxiliary turbine 99, and valves 17 and 18, are manipulated by the operator to control the opening and closing of the turbine nozzles for regulating engine power.

The turbine 19 is shown diagrammatically in Fig. 3. It drives a gear, 20, which operates the reduction gear, 21, to which the propeller, 22, is attached.

After the vapor has been expanded in the turbine it enters space 23, where is encounters a regenerator coil which absorbs superheat from the vapor, as described below. The cooled vapor then following the path of the arrows, enters the condenser chamber 26a at 25. The condenser chamber is the whole space within the boundary walls 26, of the unit, except the space occupied by the turbine and the space 27, which contains the reduction gears 21. Space 27 is isolated from the rest of the condenser to prevent the condensed liquid from interfering with the lubrication of the gears.

The vapor condenses all over the surface 26, and collects in the bottom. Two liquid outlets 30, one at the end of each of the arms 29, are provided. They are closed by valves 31, on arms 32. Floats 33 cause the valves to open when enough liquid has collected to raise the floats. The two valved liquid outlets so located, are necessary because there are times when the plane is not level or when it is not perpendicular to the resultant of gravity and centrifugal force, in which case the liquid will flow to one end of the unit, and if there were but one liquid outlet, it would then be above the liquid level so the pump would suck vapor and no liquid would return to the heater.

With my arrangement, the float valves shut off the outlets unless they are covered by liquid, so that liquid will always be returned to the heater through the submerged outlet, whatever the aspect of the plane.

The liquid is sucked through pipes 35, by the sump pump 34, which can be a rotary pump driven by the propeller shaft, and is delivered through pipe 36, to one end of the regenerator coil 24, where it travels in countercurrent relation to the exhaust vapor and picks up the superheat remaining in it. It then flows to the liquid receiver 37, via pipes 38, 39 and 40.

As already stated, pressure pump 41 takes liquid from the receiver and pumps it into the heater 11. The pump 41 can conveniently be an electric driven rotary gear pump, deriving its power from the auxiliary turbine, 99. This turbine may provide power for the electric generator, oil pumps for lubrication, and for landing gears, fuel, oil burner, etc.

The operation of the system may be more clearly understood by giving an illustrative example, as follows: It will be assumed that F—11 is the working fluid; that the heater pressure is 800 lbs. per sq. in., and the temperature a little over 700° F.; that the plane is traveling at high altitude and the ambient temperature is low enough so the condensing temperature is 0° F.

Starting at point A, Fig. 6, one pound of liquid F—11, leaving the condenser, has the following condition: Temperature=0° F.; pressure=2.55 lbs. abs.; volume=.0192 cu. ft.; and heat=7.89 B. t. u.

Sump pump 34 raises its pressure to that of the receiver 37, and it enters the regenerator 24, at point B, where its condition is: T=0° approx.; P=20; H=7.9 B. t. u. In passing through the regenerator 24, it picks up 18.5 B. t. u. (to be explained later). It leaves the regenerator at B′ and enters the receiver 37. At B′ its condition is: T=91°, P=20, V=.0110, H=26.4 B. t. u. It now enters the pressure pump 41, where its pressure is raised to 800 lbs. and it enters the heater at C, where its condition is: T=100° approx.; P=800, H=28.0 B. t. u. (neglecting what it may have obtained from the furnace gases). The increase of temperature and heat from B to C is due to the work done on the liquid by the pump, which equals 1.6 B. t. u. At C heating from the flame of heater begins, and the temperature of the fluid increases substantially uniformly as it passes through the heater until it crosses the 388° temperature line, when it becomes a vapor. It continues along the 800 pressure line until it reaches D, where its condition is: P=800; T=710° approx.; H=183 B. t. u. The heat input is $H_D - H_C = 183 - 28 = 155$ B. t. u. At D it enters the turbine and expands to the condenser pressure. The point E represents its condition after expansion. T=155° approx., P=2.55, V=18.5 approx., H=112.5 B. t. u. The energy available for shaft work in the turbine is $H_D - H_C - 1.6$ (pump) $= 183 - 112.5 - 1.6 = 68.9$ B. t. u. After expansion, the vapor enters the regenerator and imparts most of its remaining superheat to the liquid. Assuming that the liquid entering the regenerator is 0° F., and that in the countercurrent regenerator it can cool the vapor to a temperature differential of 25° F., the vapor would leave the regenerator at 25° F. At point F, its condition is: P=2.55, T=25° F., V=15, H=94 B. t. u. The heat transferred to the liquid is heat at E, 94 B. t. u., minus heat at F, 112.5−94 B. t. u.=18.5 B. t. u. The vapor now enters the condenser at F and emerges at A as a liquid in the original condition. The heat wasted is heat at F., 94 B. t. u., minus heat at A, 7.89 B. t. u.= 86.1 B. t. u. The cycle is now completed.

Heat balance is as follows:

|  | Heat in | Heat out |
|---|---|---|
| Regenerator to liquid B—B' | 18.5 |  |
| External heat CD | 155.0 |  |
| Expansion in turbine DE |  | 68.9 |
| Regenerator from E—F |  | 18.5 |
| Condensation |  | 86.1 |
|  | 173.5 | 173.5 |
| Thermal efficiency $\frac{68.9}{155}$ 44.4% |  |  |
| $\frac{\text{B. t. u. available energy}}{\text{Cu. ft. of vapor to condenser}}$ | $\frac{68.9}{15}$ | 4.6 |

Comparing these figures with steam, the minimum practical working condenser pressure for steam is about ½ lb. absolute, corresponding to a temperature of 80° F. Expanding steam from 700° F., 800 lbs. to ½ lb. gives a theoretical thermal efficiency of 41%. The reason why F—11 is more efficient is because it can utilize lower condensing temperatures than can be used with steam.

If the F—11 were heated to 500° F., point G, and expanded, it would arrive at H on the saturated vapor curve and the regenerator would not be needed. However, the efficiency would be 35.7%, so a gain of 8.7% is achieved by regeneration.

This example, and the diagram, show clearly that the efficiency of this system increases with low temperature and is not affected by altitude, so it is particularly well adapted for low temperature, high altitude flying.

In this system, a central source of heat supplies several units with power, and provision must be made to prevent all units from failing, in the event of the failure of one. Failure due to rupture, as from gun-fire, can occur on the high or low pressure side of the turbine.

On the high pressure side automatic shut-off valves 43 are provided on each pipe leading from the heater. These valves, 43, Fig. 5, comprise a valve, 44, normally kept open by a spring, 45. This spring will hold the valve open against the slight throttling of the normal flow of vapor past the valve, but in the event of a rupture in the high pressure line, the flow will be increased, and the valve will seat and remain seated, shutting off the ruptured unit.

If failure occurs in the condensing system and the condenser is below atmospheric pressure, air will enter the condenser and the effect will be simply to decrease the efficiency of the unit without putting it out of action.

If the condenser pressure is above atmospheric, a loss of working fluid will occur.

Gauges 46, showing the condenser pressure for each unit, will show the operator the condition of each condensing system and indicate whether a unit must be shut down or not.

A liquid level gauge 120 on the receiver will indicate failure or leakage to the liquid lines or pumps or in the condenser.

The heater can be located in the least vulnerable portion of the plane, and can be armored against machine-gun fire.

The lack of vulnerability of this system coupled with the fact that non-inflammable fuel can be used renders it safe as possible.

Although only one application of the method of the invention has been illustrated and described, other applications, which will now appear to those skilled in the art, may be made without departing from the scope of the invention. Reference is therefore to be had to the appended claims for a definition of the limits of the invention.

I claim:

1. A method of converting heat into work which includes employing a non-inflammable vaporizable working fluid containing carbon, chlorine and fluorine as essential elements in stable chemical combination; raising the pressure of the fluid while in the liquid phase, to a pressure near or above its critical pressure; applying external heat to heat said liquid to critical temperature and vaporize it; superheating the vapor to a temperature high enough to ensure dry vapor throughout its desired expansion range; expanding the vapor to desired condensing pressure; utilizing the expansion of said vapor to perform useful work; condensing the vapor to a liquid, and repeating the cycle.

2. A method of converting heat into work by a thermodynamic cycle of vaporizing, superheating, expanding and liquefying a fluid, which method includes employing a vaporizable non-inflammable working fluid containing carbon, chlorine and fluorine as essential elements in stable chemical combination; preheating said fluid while in the liquid phase; raising the liquid to a pressure near or above its critical pressure; applying external heat to heat said liquid to critical temperature and vaporize it; superheating the vapor to a temperature ensuring dry vapor throughout its desired expansion range; expanding the superheated vapor to a condensing pressure; utilizing the expansion of said vapor to perform useful work; applying superheat still remaining in the expanded vapor to preheat the liquid as above specified; condensing the vapor to a liquid, and repeating the cycle.

3. A method of converting heat into work which includes employing a vaporizable non-inflammable working fluid containing carbon, chlorine and fluorine as essential elements in stable chemical combination; raising the pressure of the fluid while in the liquid phase, to a pressure near or above its critical pressure; applying external heat to heat said liquid to critical temperature and vaporize it; superheating the vapor; expanding the vapor to desired condensing pressure; utilizing the expansion of said vapor to perform useful work; condensing the vapor to a liquid, and repeating the cycle.

4. A method as specified in claim 3, and wherein the working fluid is trichloro-monofluoromethane, ($CCl_3F$).

5. A method as specified in claim 3, and wherein the working fluid is dichloro-monofluoromethane, ($CHCl_2F$).

6. A method as specified in claim 3, and wherein the working fluid is trichloro-trifluoro-ethane, ($C_2Cl_3F_3$).

7. A method of converting heat into work by a thermodynamic cycle of vaporizing, superheating, expanding and liquefying a fluid, which method includes employing as the working fluid a vaporizable non-inflammable fluid comprising carbon, chlorine and fluorine in stable chemical combination, raising the pressure of said fluid to a pressure between 400 and 1000 pounds per square inch, while in the liquid state, heating said liquid to a temperature between 200° F. and 420° F. to vaporize it without boiling, superheating the vapor to a temperature high enough to ensure dry vapor throughout the desired expansion range, expanding said vapor, utilizing the expansion of said vapor to perform useful work, condensing said vapor to a liquid, and repeating the cycle.

8. A method of converting heat into work by a thermodynamic cycle of vaporizing, superheating, expanding and liquefying a fluid, which method consists in using trichloro-monofluoro-methane (CCl₃F) as the working fluid, which is chemically stable, initially raising the pressure of said fluid from approximately 2.5 pounds per square inch at 0° F. to about 20 pounds per square inch while in the liquid state, whereby the temperature of said liquid is raised to between 90° F. and 100° F., further raising the pressure of said liquid to approximately 800 pounds per square inch without vaporization, heating said liquid to approximately 388° F. to vaporize it without boiling, superheating the vapor to a temperature between 388° F. and 710° F. to ensure dry vapor throughout the desired expansion range, expanding said vapor to a condensing pressure of approximately 2.5 pounds per square inch, utilizing the expansion of said vapor to perform useful work, condensing said vapor to a liquid, and repeating the cycle.

9. A method of powering a propeller-driven aircraft by converting heat into work by a thermodynamic cycle of vaporizing, superheating, expanding and liquefying a fluid, which method includes employing as the working fluid a vaporizable non-inflammable fluid comprising carbon, chlorine and fluorine in stable chemical combination, raising the pressure of said fluid to a pressure between 400 and 1000 pounds per square inch while in the liquid state, heating said liquid to a temperature between 200° F. and 420° F. to vaporize it without boiling, superheating the vapor to a temperature high enough to ensure dry vapor throughout the desired expansion range, expanding said vapor to a desired condensing pressure, utilizing the expansion of said vapor to drive the aircraft propeller, condensing said vapor to a liquid, and repeating the cycle.

10. A method of powering a propeller-driven aircraft by converting heat into work by a thermodynamic cycle of vaporizing, superheating, expanding and liquefying a fluid, which method consists in using trichloro-monofluoro-methane (CCl₃F) as the working fluid, which is chemically stable, initially raising the pressure of said fluid from approximately 2.5 pounds per square inch at 0° F. to about 20 pounds per square inch while in the liquid state, whereby the temperature of said liquid is raised to between 90° F. and 100° F., further raising the pressure of said liquid to approximately 800 pounds per square inch without vaporization, heating said liquid to approximately 388° F. to vaporize it without boiling, superheating the vapor to a temperature between 388° F. and 710° F. to ensure dry vapor throughout the desired expansion range, expanding said vapor to a condensing pressure of approximately 2.5 pounds per square inch, utilizing the expansion of said vapor to drive the aircraft propeller, condensing said vapor to a liquid, and repeating the cycle.

11. A method of converting heat into work by a thermodynamic cycle of vaporizing, superheating, expanding and liquefying a fluid, which method includes employing a vaporizable non-inflammable fluid comprising carbon, chlorine and fluorine in stable chemical combination and having the following characteristics: (a) melting point between −30° F. and −252° F. (b) critical pressure between 400 and 1000 pounds per square inch. (c) critical temperature between 200° F. and 500° F. (d) density between 0.3 and 2.6; raising the pressure of the fluid near or above its critical pressure while in the liquid phase, heating said liquid to its critical temperature to vaporize it without boiling, superheating the vapor to a temperature high enough to ensure dry vapor throughout the desired expansion range, expanding said vapor to a desired condensing pressure, utilizing the expansion of said vapor to perform useful work, condensing said vapor to a liquid, and repeating the cycle.

12. A method of converting heat into motive power by a thermodynamic cycle of vaporizing, superheating, expanding and liquefying a fluid comprising carbon, chlorine and fluorine in stable chemical combination.

13. A method of converting heat into motive power by a thermodynamic cycle of vaporizing, superheating, expanding and liquefying a fluid comprising trichloro-monofluoro-methane (CCl₃F).

14. A method of converting heat into motive power by a thermodynamic cycle of vaporizing, superheating, expanding and liquefying a fluid comprising dichloro-monofluoro-methane (CHCl₂F).

15. A method of converting heat into motive power by a thermodynamic cycle of vaporizing, superheating, expanding and liquefying a fluid comprising trichloro-trifluoro-ethane (C₂Cl₃F₃).

BRADFORD B. HOLMES.